United States Patent
Hill (10) Patent No.: US 7,456,361 B2
(45) Date of Patent: Nov. 25, 2008

(54) CLIP FOR FLEXIBLE ARMORED CABLE

(76) Inventor: Douglas C. Hill, 6244 Eastland Rd., Brookpark, OH (US) 44142

( * ) Notice: Subject to any disclaimer, the term of this patent is extended or adjusted under 35 U.S.C. 154(b) by 164 days.

(21) Appl. No.: 11/450,119

(22) Filed: Jun. 9, 2006

(65) Prior Publication Data
US 2007/0049073 A1  Mar. 1, 2007

Related U.S. Application Data

(60) Provisional application No. 60/759,715, filed on Jan. 18, 2006, provisional application No. 60/688,954, filed on Jun. 9, 2005.

(51) Int. Cl.
*F16L 3/08* (2006.01)
(52) U.S. Cl. .................. 174/84 C; 248/74.2
(58) Field of Classification Search ............ 174/84 C, 174/102 D, 135; 248/68.1, 74.2, 74.3
See application file for complete search history.

(56) References Cited

U.S. PATENT DOCUMENTS

| | | |
|---|---|---|
| 810,004 A | 1/1906 | Tabler |
| 886,241 A | 4/1908 | Norton |
| 1,818,625 A * | 8/1931 | Hunter ............ 248/74.3 |
| 2,375,513 A | 5/1945 | Bach |
| 2,469,451 A | 5/1949 | Burrus |
| 2,541,828 A | 2/1951 | Peck |
| 2,588,251 A | 3/1952 | Kost |
| 2,868,489 A | 1/1959 | Calcut |
| 3,154,281 A | 10/1964 | Frank |
| 3,252,677 A | 5/1966 | Raymond |
| 3,370,815 A | 2/1968 | Opperthauser |
| 3,471,987 A | 10/1969 | Yelsma |
| 3,602,956 A | 9/1971 | Eddens et al. |
| 3,894,706 A | 7/1975 | Mizusawa |
| 3,905,570 A | 9/1975 | Nieuwveld |
| 4,119,285 A | 10/1978 | Bisping et al. |
| D257,950 S | 1/1981 | Van Meter, Jr. et al. |
| 4,669,156 A | 6/1987 | Guido et al. |
| 4,796,848 A | 1/1989 | Lanz |
| 4,824,057 A | 4/1989 | Suprono |
| 4,881,705 A | 11/1989 | Kraus |
| 4,903,629 A | 2/1990 | Maudlin et al. |
| 4,903,920 A | 2/1990 | Merritt |
| 4,934,635 A | 6/1990 | Sherman |
| 4,991,801 A | 2/1991 | Trumbull |
| 5,018,260 A | 5/1991 | Ziu |
| 5,028,020 A | 7/1991 | Sundholm |
| 5,090,645 A | 2/1992 | Zuercher |
| 5,118,215 A | 6/1992 | Freier |
| D333,256 S | 2/1993 | Newcomer et al. |
| D333,257 S | 2/1993 | Newcomer et al. |
| 5,184,792 A | 2/1993 | Bernhard et al. |
| 5,188,318 A | 2/1993 | Newcomer et al. |

(Continued)

*Primary Examiner*—Chau N Nguyen
(74) *Attorney, Agent, or Firm*—Fay Sharpe LLP (57) ABSTRACT

A clip for securing a flexible armored cable to a structural object. The clip including a longitudinally extending clip body having a generally C-shaped wire receiving cavity extending in the longitudinal direction and about a cavity axis with a longitudinally extending cable receiving slot. The wire receiving cavity having a plurality of transverse ribs that are parallel to one another wherein each of the ribs has a first end and a second end that are circumferentially space about the cavity axis and which are longitudinally spaced. The ribs being configured to extend into a portion of a trough in the armored cable.

22 Claims, 5 Drawing Sheets

U.S. PATENT DOCUMENTS

| | | |
|---|---|---|
| 5,384,936 A | 1/1995 | Van Walraven |
| 5,463,189 A | 10/1995 | Deneke et al. |
| 5,626,316 A | 5/1997 | Smigel et al. |
| 5,639,049 A | 6/1997 | Jennings et al. |
| 5,967,468 A | 10/1999 | Veghte et al. |
| 6,109,569 A | 8/2000 | Sakaida |
| 6,152,412 A | 11/2000 | Basickes et al. |
| D438,781 S | 3/2001 | Leach |
| 6,216,987 B1 | 4/2001 | Fukuo |
| 6,390,421 B1 | 5/2002 | Rudd |
| 6,444,907 B1 | 9/2002 | Kiely |
| 6,644,892 B2 | 11/2003 | Nishiwaki et al. |
| 6,682,025 B2 | 1/2004 | Turner et al. |
| 6,825,418 B1 | 11/2004 | Dollins et al. |
| 7,131,170 B2 * | 11/2006 | Weaver .................. 24/545 |
| 2003/0164430 A1 | 9/2003 | Walraven |
| 2004/0004164 A1 | 1/2004 | Chen |
| 2005/0011996 A1 | 1/2005 | Geater |
| 2006/0006292 A1 | 1/2006 | Kleeb et al. |

* cited by examiner

CLIP FOR FLEXIBLE ARMORED CABLE

This application claims priority on U.S. provisional application Ser. No, 60/688,954, filed Jun. 9, 2005, entitled "CLIP" and U.S. provisional application Ser. No. 60/759, 715, filed Jan. 18, 2006, entitled "CLIP FOR FLEXIBLE ARMORED CABLE".

The invention of this applications relates to the art of electrical wiring and, more particularly, to a clip that can be used in connection with flexible armored electrical cable of all varieties and, particularly, for round flexible cable which will be referred to as flexible armored cable, cable and/or MC cable, and the method of using the same. The clip of this application is to support the MC cable in both residential and commercial applications.

INCORPORATION BY REFERENCE

The present invention relates to electrical wiring and, more particularly, for a clip for securing MC cable to a structural component of a facility. Coleman et al 5,189,719 discloses a rectangular flexible armored cable; Falciglia et al RE38,345 discloses a round flexible armored cable; and Dollins et al discloses a coded flexible armored cable. These patents are incorporated by reference herein as background information illustrating flexible armored cables including MC style cables. Tembladar 6,486,395 discloses a flexible armored cable with a special wiring configuration to illustrate that the invention of this application can be used in connection with all flexible armored cable, regardless of the wire gauge and/or wire configuration in the flexible armored cable, and is also incorporated by reference herein as background information.

BACKGROUND OF THE INVENTION

The present invention is particularly applicable for use in connection with commercial installation of electrical wiring and, thus, will be discussed with respect to commercial applications. However, the invention of this application is not to be limited to commercial applications. In this respect, many commercial applications require some form of protection of the electrical wiring in a facility. For many years, electricians ran wire through rigid pipes. Now, with the development of flexible armored cable, rigid pipes are not needed. As can be appreciated, this eliminates the step of hanging rigid pipe and pulling the wire through the pipe. Further, since the armor is flexible, it can be easily manipulated around obstacles without jeopardizing the insulated qualities of the wire.

It is, of course, also well known that the electrical wiring in any facility must be insulated and secured to the structure in such a way that the electrical current is controlled and prevented from harming people and property. That is why virtually all electrical wiring sold includes some form of insulation. This can include the thin insulation surrounding the wire core and an outer layer of insulation surrounding the wire insulation. In some cases, the outer layer is made from a material similar to the wire insulation, such as a polymeric material. The wiring can also include a hard outer layer to further protect the wire. For the invention of this application, the wire includes a flexible armored outer layer to protect the wire. While the flexible armored layer, as is described in the above referenced patents, is typically made from a metallic material in today's electrical industry, it should be appreciated that the invention of this application could also be used in connection with non-metal flexible armored cables and other cables that could be used or will be used in the electrical industry.

While it has been found that flexible armored cables provide an efficient and effective means for wiring a facility with a protected electrical wire, the flexible armored cable must still be secured to the structure of the facility to be wired. This includes mounting the flexible armored cable to the studs in the facility, which could be wooden studs, but are typically metal studs in today's commercial construction projects. The mounting also includes mounting the flexible armored cable to ceiling structures and other structures. As can be appreciated, especially with commercial construction, the ceiling can be very high, wherein it is best to utilize mechanisms that are quick and easy to use, to minimize the time and expense of wiring a facility. Further, as can also be appreciated, mounting structures that only require one hand to use can be very beneficial since the other hand can be utilized to guide the cable and/or to maintain one's balance.

Prior art clips have been created to help secure the flexible armored cable to the facility; however, these clips are difficult to use, require tools and both hands. In addition, these prior art clips are costly.

SUMMARY OF THE INVENTION

In accordance with the present invention, provided is a clip for flexible armored cable and, more particularly, provided is a clip that is easily securable to a building's structural components and is configured to allow the flexible armored cable to be easily and quickly secured to the clip.

In this respect, a clip according to the present invention is for use with a flexible armored cable to secure the cable to a structural object. The flexible armored cable has a central cable axis and an outer armored layer extending about the cable axis wherein the outer layer is formed from alternating crowns and troughs helically wound about the cable axis such that the crowns and troughs are not perpendicular to the cable axis. The clip, according to one aspect of the present invention, includes a longitudinally extending base with a bottom portion for engaging the structural object. The clip further includes a first end and a second end longitudinally spaced from the first end and a first side wall extending upwardly from the base between the first and second base ends. The first side wall includes a first inwardly extending surface forming a first portion of a longitudinally extending cable cavity wherein the first portion has a first upper edge. The clip further includes a second side wall extending upwardly from the base between the first and second base ends and has a second inwardly extending surface forming a second portion of the cable cavity. The second portion faces the first portion and has a second upper edge spaced from the first upper edge thereby forming a longitudinally extending entry gap for receiving the cable that is opposite to the base. These first and second side walls are also bendable between a relaxed condition when the cable is not positioned in the cavity and an engaged condition when the cable is positioned in the cavity such that the cable extends longitudinally through the cavity. The cable cavity has a generally oval cross-sectional configuration when in the relaxed condition with a height between the bottom extent of the cavity and the entry gap and a width between the first and second inwardly extending surfaces wherein the height is greater than the width when in the relaxed condition. The clip can further including at least one transverse rib in the cavity configured to at least partially enter a trough in the cable when the clip is in the engaged condition.

In accordance with another aspect of the present invention, provided is a clip for securing a flexible armored cable to a structural object which includes a longitudinally extending clip body having a generally C-shaped wire receiving cavity extending in the longitudinal direction and about the cavity axis with a longitudinally extending cable receiving slot. The wire receiving cavity has a plurality of transverse ribs that are parallel to one another and each of these ribs has a first end and a second end that are circumferentially space about the cavity axis and which are longitudinally spaced. These ribs are configured to extend into a portion of a trough in the cable.

BRIEF DESCRIPTION OF THE DRAWINGS

The foregoing and more, will, in part, be obvious and, in part, be pointed out more fully hereinafter, in connection with a written description of preferred embodiments of the present invention illustrated in the accompanying drawings in which.

DESCRIPTION OF PREFERRED EMBODIMENTS

Referring now in greater detail to the drawings, wherein the showings are for the purpose of illustrating preferred embodiments of the invention only, and not for the purpose of limiting the invention FIGS. 1-7 show a clip 10 having a base portion 12 extending between an end 14 and an end 16 that together define longitudinal direction 18. Clip 10 further includes side walls 20 and 22 that also extend in the longitudinal direction.

Clip 10 further includes a cable receiving cavity 30 that is oval or C-shaped which can extend from end 14 to end 16, but can be shorter. Cavity 30 is shaped to receive a section of an armored cable or MC-cable C to secure cable C to the clip such that the clip can be used to support the cable on an structural object such as on a stud S. Cavity 30 extends circumferentially about a cavity axis 32. Cavity 30 is formed at least in part by inner surfaces 40 and 42 of walls 20 and 22, respectively. Inner surface portions 40 & 42 can be joined to one another or can be connected by a base surface portion 44 near base 12. Further, cavity 30 can be a smooth arcuate cavity or can be polygonal such that it is still generally C-shaped. As can be appreciated, and for example only, surface portion 40 or 42 could be formed by a plurality of non-parallel flat surface portions producing a polygonal cross-sectional configuration or could be formed by a unified arcuate surface without detracting from the invention of this application.

Figures 1, 2:
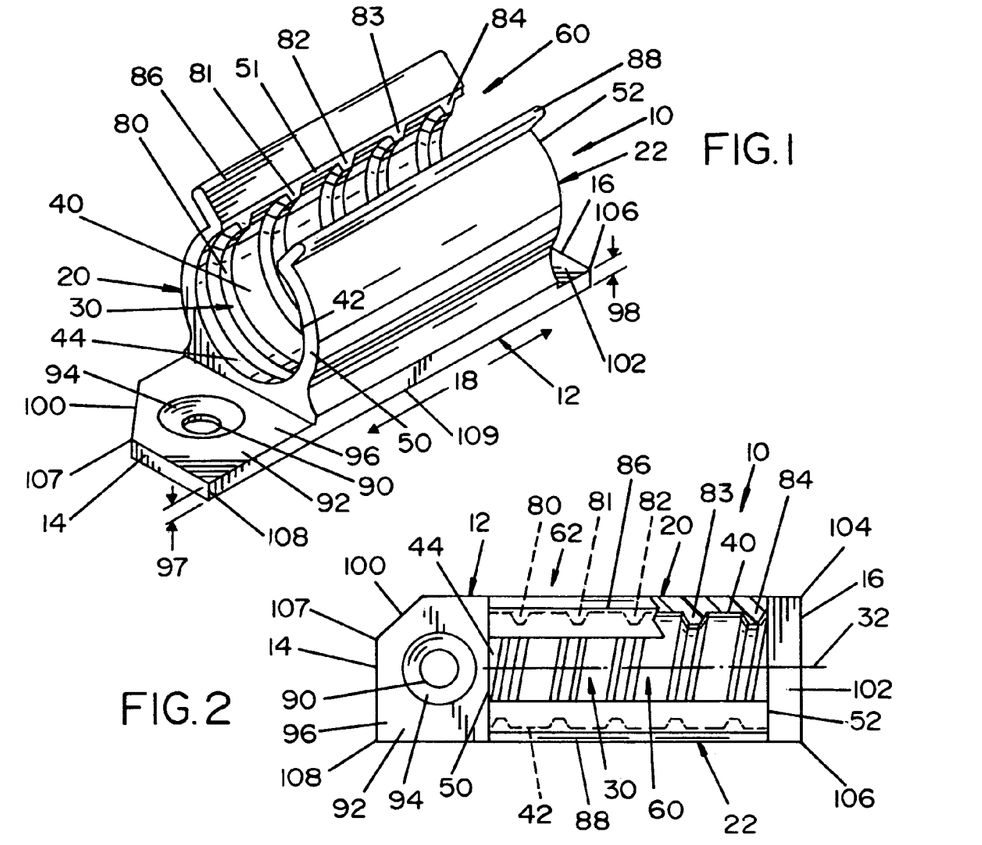
FIG. 1 is a perspective view of a clip in accordance with an aspect of the present invention.
FIG. 2 is a top, partially sectioned, view of the clip shown in FIG. 1.
Figure 3:
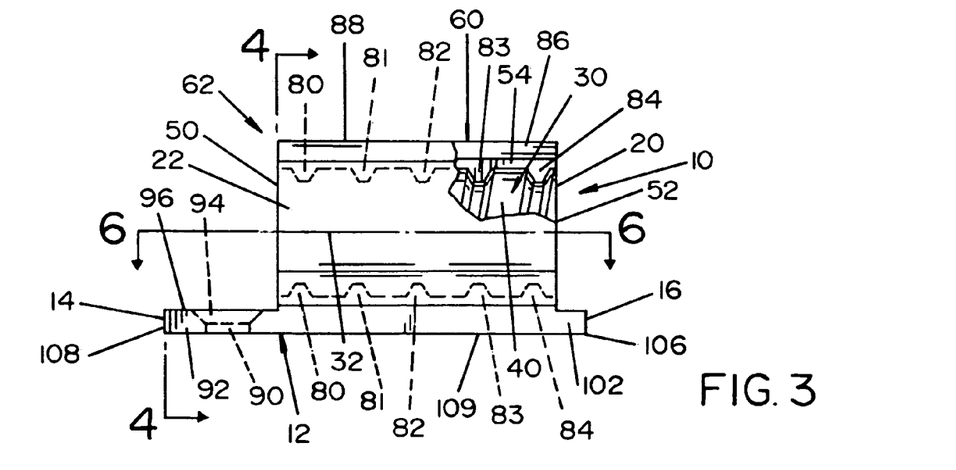
FIG. 3 is a side, partially sectioned, view of the clip shown in FIG. 1.
Figure 4:
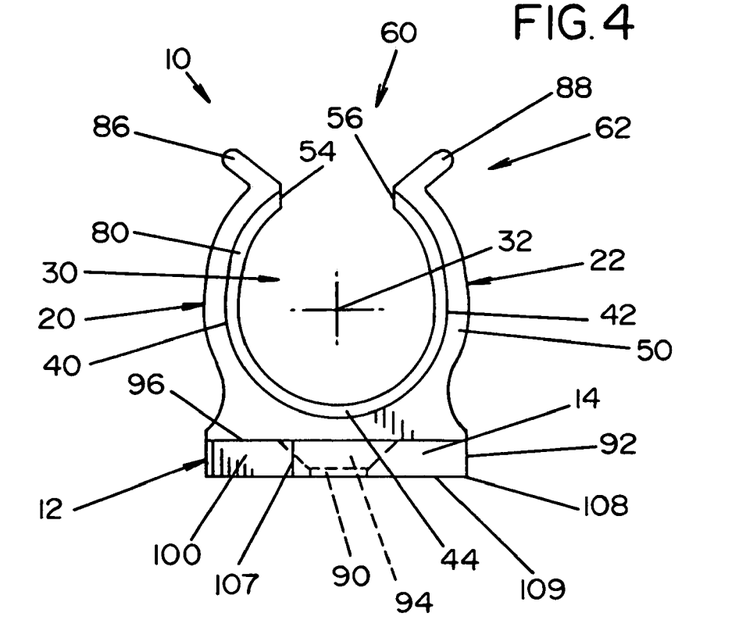
FIG. 4 is a front view taken from lines 4-4 in FIG. 3.

Again, cavity 30 extends longitudinally in direction 18 and is shown to extend between cavity ends 50 and 52. Cavity 30 extends circumferentially between top edges 54 and 56. While cavity 30 is shown to be continuous, cavity 30 does not need to be continuous and could include gaps, mounting arrangements etc. including, but not limited to, a central mounting hole (not shown) in the cavity to secure the clip to a structural object which will be discussed in greater detail below.

Figure 5:
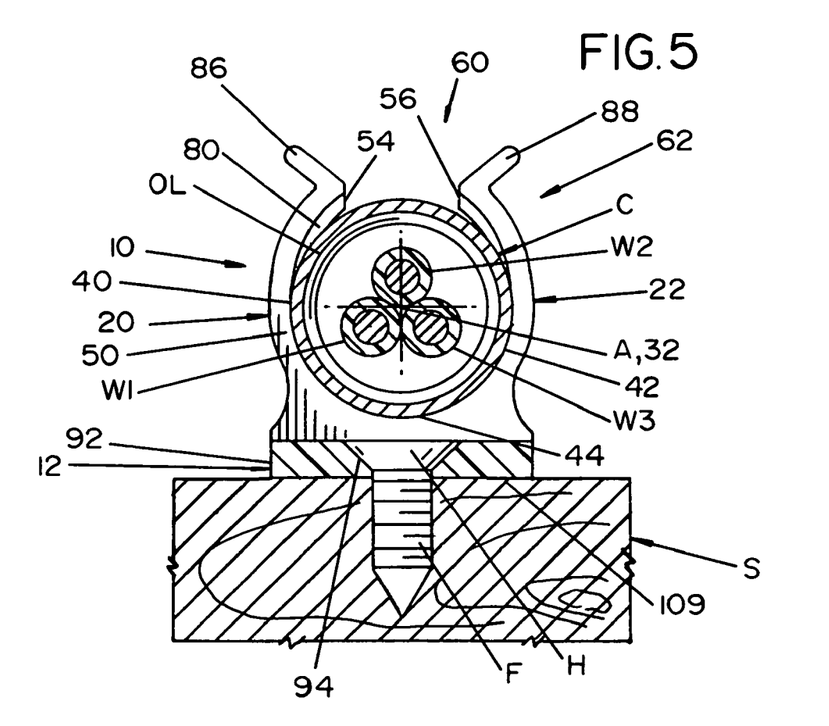
FIG. 5 is a sectional view of the clip shown in FIG. 1 wherein a cable is secured to the clip and the clip is secured to a wall stud.

Top edges 54 and 56 at least in part form the edges of a top opening 60 sized to allow the cable to enter cavity 30 with resistance. As can be appreciated, the size of this opening is dependent on the size of the cable to be inserted. This opening can be a wide range of sizes and in one embodiment, the opening is between 0.23 inches and 0.33 inches and preferable around 0.28 inches when in a relaxed condition 62, as is shown in the several figures including FIG. 4. However, clip 10 is made from a material that can flex such that when the cable is inserted into cavity 30, edges 54 and 56 will move away from one another based on the insertion force of the cable which will temporarily enlarge opening 60 and cavity 30. This allows the cable to be pressed into the clip. Once the cable is moved through opening 60 and positioned in cavity 30, the clip moves inwardly around the cable and automatically positions itself into an engaged condition 62, as is shown in FIG. 5 wherein at least a portion of the inner surfaces engage the cable which will be discussed in greater detail below.

As is discussed above, the cable can include a central cable axis A wherein several wires extend generally parallel to this cable axis. These cables typically include three to five wires and as is shown, cable C includes three wires W1, W2 and W3. Further, these wire can be different gauges. As a result, while many MC cables are standards, there could be different sizes of cable and, therefore, different clip sizes. Further, the clip can be configured to work in connection with a number of differently sized MC cables which can require greater flexibility in design and/or materials. The wire are maintained within an outer armored layer OL extending about the cable axis wherein the outer layer is formed from alternating crowns CR and troughs TR that can be helically wound about the cable axis such that the crowns and troughs are not perpendicular to the cable axis.

Figure 6:
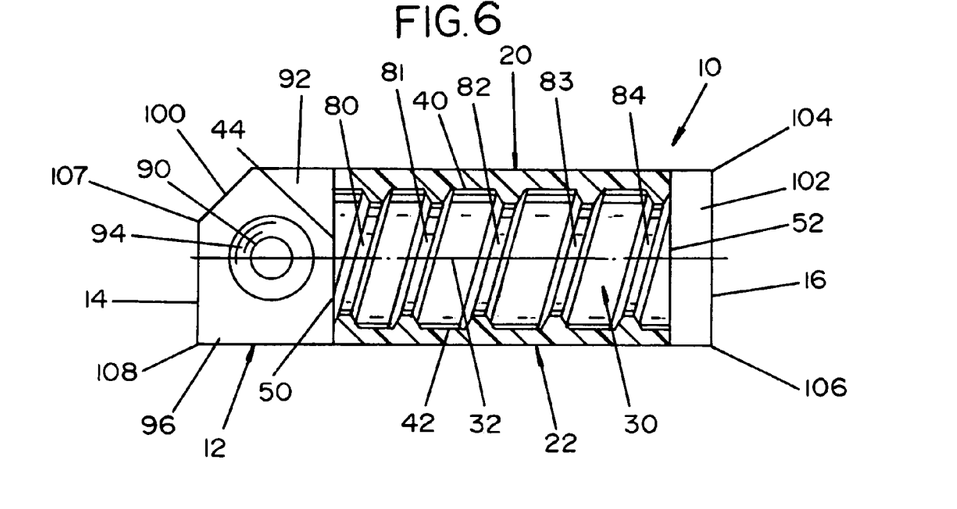
FIG. 6 is a top, partially sectioned, view taken along lines 6-6 in FIG. 3.

In order to meet some building codes, fastening devices, such as the clip of this application, need to secure the cable such that it can withstand a given pulling load or pull test. In this respect, the clip must withstand an axial pulling load such that the cable does not slip axial relative to the clip. In order to increase the pulling resistance of the clip, clip 10 can include a rib arrangement on the inner surfaces. In this respect, in one embodiment, clip 10 includes ribs 80-84. However, while five ribs are shown, more or less ribs could be utilized without detracting from the invention of this application. Further, the ribs can have more than one configuration and each rib does not need to be identical. In one embodiment, the ribs extend from near edge 54 to near edge 56 such that the ribs extend about a substantial portion of cavity 30. Further, as is best shown in FIG. 6, ribs 80-84 can have a helical slant that is the same or similar to the helical wrapping of the cable. In this respect, the ribs can be at an angle to the cavity or cable axis that is not 90 degrees. As can be appreciated, this configuration allows the ribs to better engage the crowns and troughs of the cable. As can be also appreciated, the ribs do not need to extend from edge 54 to edge 56. These ribs could be short ribs that engage a small portion of the crown and trough arrangement of the cable. In one embodiment (not shown), the ribs can be shortened ribs without significant helix wrap.

These ribs secure MC cable longitudinally while the C-shape of the clip maintain the MC cable axially. As can be appreciated, the use of ribs in the central portion of the clip requires the sides of the C-shaped portion to flex axially outwardly before the MC cable can move substantially longitudinally along the cable axis. This creates significant pull resistance by the clip without the need for complicated and/or difficult to engage mechanisms. In this respect, prior art clips require the end user to use a tool, either a screw driver or a pair of pliers, to properly secure the clip from movement in the longitudinal direction.

As can be appreciated, the longitudinal thickness of the rib or ribs can vary and can influence the desired angle of the rib. In this respect, thicker ribs should be configured more closely to the angle of the recess in the MC cable while thinner ribs can have a rib angle that varies more from the actual angle of the recess in the MC cable. As can be also appreciated, thinner ribs can also be used for clips designed for differently sized cables or cables produced by different manufacturers which have different ranges of tolerance.

The cross-sectional configuration of the ribs can be polygonal, such as the ribs shown or can be other configurations. Again, at least in part, the ribs' cross-sectional configuration is based on the configuration of the recesses in the MC cable. However, other cross-sectional configurations could also be used.

The clip according to another aspect of the present invention can also include clip-opening flanges 86 and 88 near edges 54 and 56 respectively. These flanges can be used to create a ramp-like effect for the cable to make it easier to force the cable into the clip. As is discussed above, it is desirous that that cable can be positioned in the clip with the use of only one hand. Further, it is also desired that the clip securely engage the cable. These lead in tapers or clip-opening flanges on the open side of the C-shaped portion allow the clip to be opened by merely pushing the MC cable axially against the open side of the C-shaped portion. The cable will drive the sides of the C-shaped section away from each other until the MC cable enters the clip, and then the walls will return toward their natural state. As can be appreciated, the walls may not reach their natural state when they reach the engaged condition which can be used to increase the gripping force on the cable.

Figure 7:
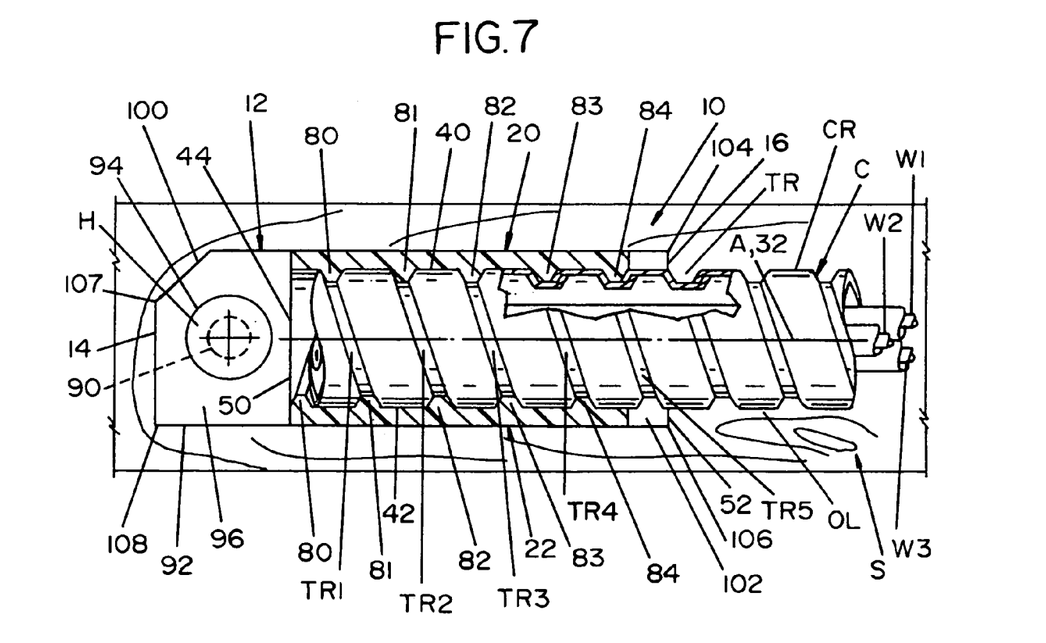
FIG. 7 is a top, partially sectioned, view of the clip shown in FIG. 1 wherein a cable is secured to the clip and the clip is secured to a wall stud.

With reference to FIG. 7, when the clip is in the engaged condition, the ribs engage the crowns and/or the troughs of the cable. More particularly, rib 80 is positioned to engage and/or enter at least a portion of trough TR1, rib 81 is positioned to engage and/or enter at least a portion of trough TR2, rib 82 is positioned to engage and/or enter at least a portion of trough TR3, rib 83 is positioned to engage and/or enter at least a portion of trough TR4, and rib 84 is positioned to engage and/or enter at least a portion of trough TR5. As can be appreciated, while the troughs are described as being different troughs, this is for illustrative purposes only in that the troughs of cable C are typically helically wound such that the trough is a continuous trough. Further, the ribs can be designed to just enter the troughs wherein the inner surfaces 40, 42 and/or 44 engage the crown portion of the cable. However, clip 10 could be configured to work in connection with any crown and trough arrangement including, but not limited to, independent crown and trough arrangements that are essentially perpendicular to the cable axis.

With reference to FIGS. 8-11, the clip of this application can be configured to be used in connection with a wide range of mounting arrangements. For example, the clip, according to yet another aspect of the present invention, can utilize any of a number of mounting holes including, but not limited to, a mounting hole 90 on an axially extending flange 92 that is offset from the C-shaped portion of the clip. This mounting hole can be configured to receive any fastener known in the art including, but not limited to, rivets, pop rivets, threaded fasteners and self locking or one-way style fasteners. Further, mounting hole 90 can further include a countersink portion 94 to allow a head H of a fastener F to be flush or below a top surface 96 of flange 92. As is discussed above, the mounting hole and mounting arrangement can also be any mounting arrangement know in the art without detracting from the invention of this application. This can include a self contained clips (not shown) or even multiple fastening arrangements (also not shown). In addition, the mounting hole can be positioned on other components of the clip without detracting from the invention of this application.

Figure 8:
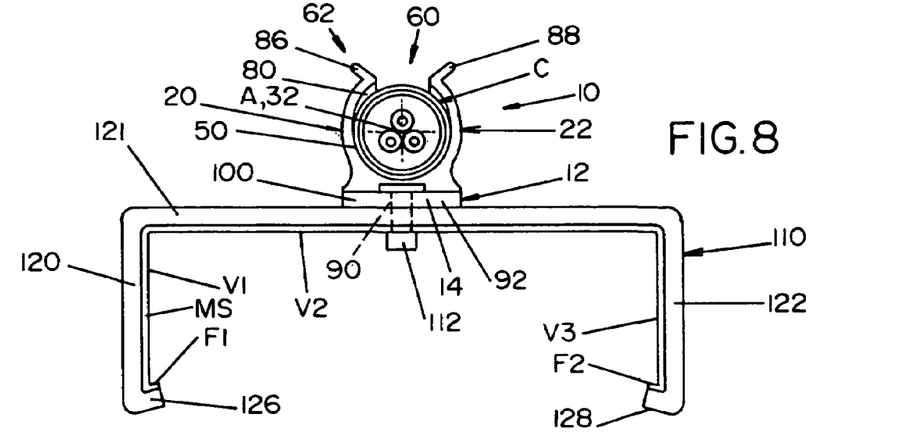
FIG. 8 is a front view of another embodiment of the invention of this application.
Figure 9:
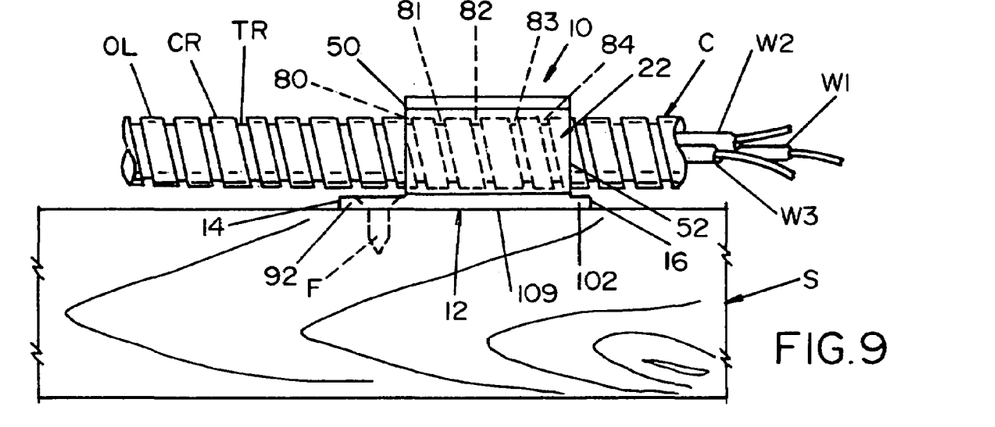
FIG. 9 is a side view of the clip shown in FIG. 8 wherein a cable is secured to the clip and the clip is secured to a wall stud.

As is shown in FIG. 8, in another embodiment, the clip of this application can be configured to be used in connection with other fastening arrangements, such as a stud strap 110. The clip can be molded to the strap as a unified component or can be attached to the strap with any known fastener in the art. This can include, but is not limited to, use of a rivet 112 and/or a one-way locking fastener. This strap arrangement can be contoured and configured to lockingly interengage with a standard 3-5/8 inch metal stud MS or other studs known in the art. The strap can also be configured to be fastened to a stud, by any known fasteners in the art. In greater detail, metal stud MS can include vertical members V1, V2 and V3 wherein members V1 and V3 include inward flanges F1 and F2. Stud strap 110 can include Strap sections 120-122 wherein clip 10 can be mounted to the strap portion 121 as is discussed above, such as by mounting hole 90. However, since the clip can be attached to the strap in an offsite operation, mass production techniques could be used to mount the clip to the strap such that other know mounting techniques could be used. As is shown, the clip could be riveted to the strap. Further, in one embodiment, the components can be molded together. The strap can be made from the same material as the clip or can be made from a different material. For example, the strap could be made from steel while the clip is made from a plastic. Strap 110 further includes a mounting arrangement to secure the strap and clip to a structural item of a building structure. This can include locking flanges 126 and 128 that extend inwardly from sections 120 and 122. In operation, the strap is positioned over the stud such that flanges "snaps" over the ends of members V1 and V2 of the stud. However, other mounting arrangements could be used to secure the strap to the stud. If the clip is preassembled onto the strap, simply snapping the strap over the stud can quickly secure clip 10 relative to stud MS.

The strap embodiment of this application can have a number of configurations. As is shown, the strap can include a single-clip mounted to the strap. However, in other embodiments (not shown), strap 110 can further include multiple clips on one strap without detracting from the invention of this application. Further, in yet another embodiment, a single strap can be configured to allow one, two, three or even more clips to be secured to a single strap based on the needs of the end user. This can include, but is not limited to, the strap having several spaced holes designed and shaped to receive a self-contained mounting arrangement in the clip or a separate fastener such as those described above, including, but not limited to, rivets. Further, the strap can be designed to be secured on either side of the metal stud.

The strap can be made from any material known in the art. This can include, but is not limited to, a metal or a plastic material, such as a non-destructive polymer plastic with fire retardant qualities having a non toxic burn.

In yet another embodiment, the fastening arrangement for the straps and/or the clip themselves can be configured to allow partial or full rotation of the clip about a desired axis. In this respect, the fastening arrangement used for the clip and/or the strap can allow the clip to rotate about an axis extending upwardly from the base of clip to allow the clip and the cable to rotate about an axis transverse to the wire axis. This can provide a clip that is easily rotatable or positionable to allow easy adjustment. Essentially, the rotation is based on the direction that the cable is being laid and the position of the next clip, and the rotation can be initiated by a tug on the cable near the next clip. For example, if the cable is being positioned near a corner or bend in the electrical line, it can be advantageous for the clip, based on the angle the end user pulls on the cable, to automatically rotate a desired amount while maintaining the cable securely at the point of attachment to the clip. Further, this rotation can be achieved when the end user is working on the next clip without the need to go back to the previous clip. As is discussed in greater detail above, the ribs within the C-shaped portion prevent the cable from pulling longitudinally out of the clip during the rotational adjustment of the clip.

In a further embodiment, the rotatable clip could also include a second mounting arrangement including, but not limited to, a second mounting hole (not shown), to lock the clip relative to the stud to prevent rotation after the job is completed. As can be appreciated, this second mounting or securing hole can be spaced from the cable axis or the clip axis so that it can be accessed when the cable is in the engaged condition.

Figure 10:
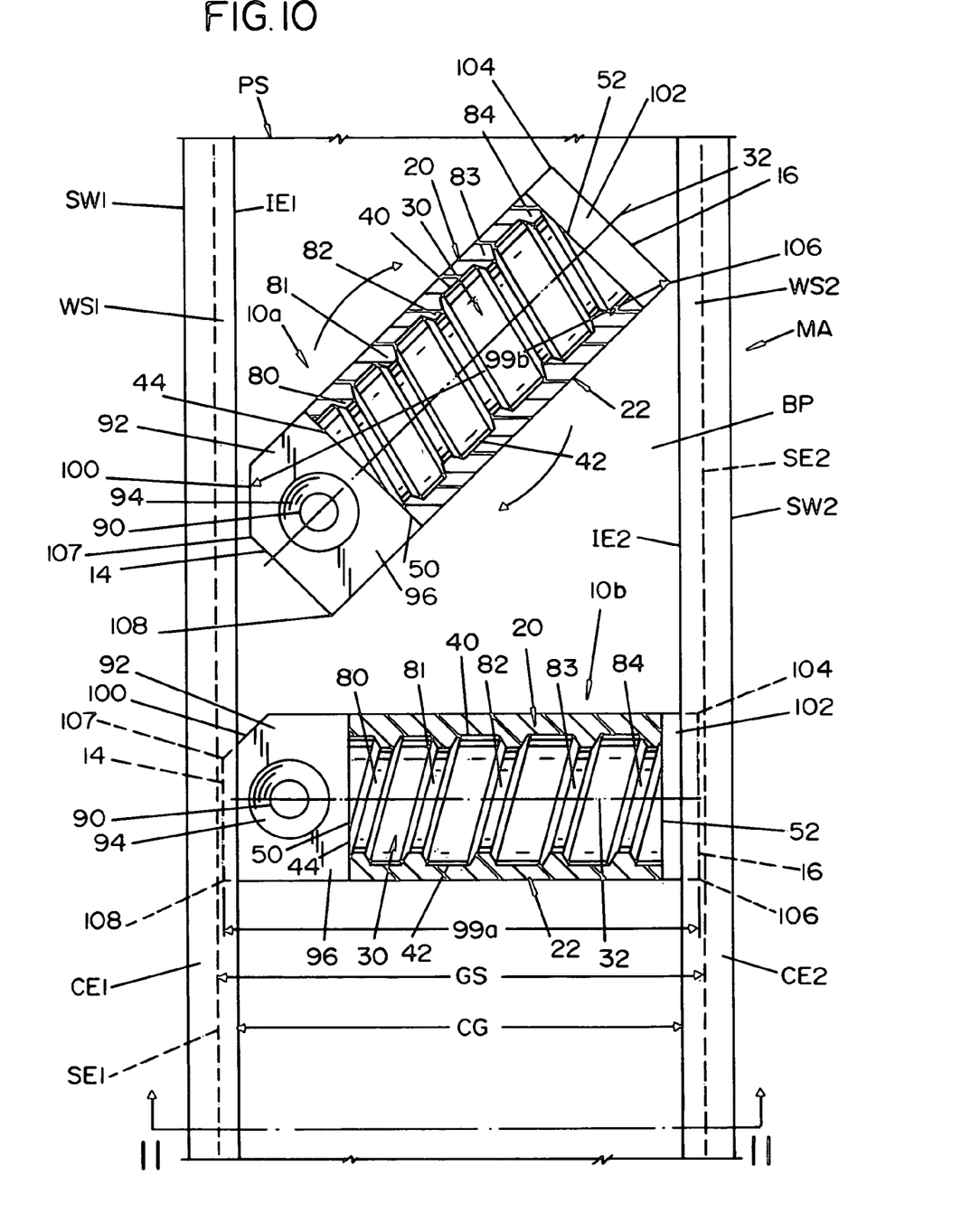
FIG. 10 is a top view of two clips wherein one clip is in position to be secured to a panel strap and the other clip is secured to the panel strap according to another aspect of the present invention; and, FIG. 11 is a sectional view taken along lines 11-11 in FIG. 10.
Figure 11:
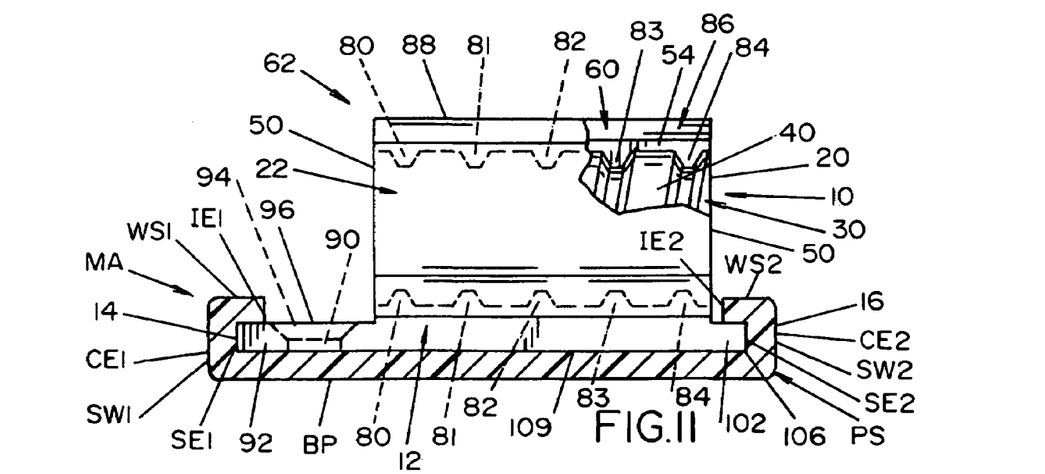

As is shown in FIGS. 10 and 11, in yet another embodiment, the clip of this application can be configured such that it locks into a panel strap PS. In this respect, shown is a mounting arrangement MA including panel strap PS and clip 10. Panel strap PS can include a base plate BP and opposing channel ends CE1 and CE2 that are spaced from base plate BP thereby forming gaps therebetween shaped to receive the clip. More particularly, panel strap PS includes side walls SW1 and SW2 that extend upwardly from base plate BP side edges SE1 and SE2, respectively. Panel strap PS further includes upper wall sections WS1 and WS2 extending inwardly from side walls SW1 and SW2, respectively, such that side wall SW1 and wall section WS1, together with a portion of base plate BP, form channel end CE1 and side wall SW2 and wall section WS2, together with a portion of base plate BP, form channel end CE2. Channel ends CE1 and CE2 further include inner edges IE1 and IE2, respectively. Inner edges IE1 and IE2 are spaced from one another a distance CG.

Shown in FIG. 10 are clips 10a and 10b which can include a corner cut 100 in flange 92 and a back side flange 102 wherein flanges 92 and 102 have a thickness 97 and 98, respectively, that are less the thickness of these gaps in the channel ends such that the flanges can enter these gaps. In addition, flange 102 can further include flange corners 104 and 106, and flange 92 can further include flange corners 107 and 108. Clip 10 has a length 99a that, in one embodiment, is greater than a gap spacing GS between side walls SW1 and SW2 which will be discussed in greater detail below. Clip 10 can further include a cattycorner length 99b between corner cut 100 and corner 106 that can be, in one embodiment, less than channel gap CG. This configuration allows the clip to be twisted into panel strap PS which will be discussed in greater detail below.

With reference to clip 10a, the clip can be oriented such that corner 106 is positioned in or near channel end CE2 wherein corner cut 100 of flange 92 is adjacent to inner edge IE1 to allow flange 92 to clear channel end CE1. As corner cut 100 clears channel end CE1, a clip bottom surface 109 can be urged against base plate BP. Once in this position, clip 10a can then be twisted clockwise relative to panel strap PS until flanges 92 and 102 snap into channels CE1 and CE2, respectively, as is shown with clip 10b. More particularly, as the clip is twisted, corner 107 of flange 92 and corner 106 of flange 102 engage side walls SW1 and SW2, respectively, such that the clips snaps into engagement with the channels and the clip is held in place relative to the strap.

In yet another embodiment, the clip can be configured such that another portion of the clip, such as edge 52, engages channel edge IE2 to create the engagement between the clip and the panel strap. In even yet another embodiment, the clip and the panel strap can be configured to produce a resistance fit between the clip and the panel strap such that the clip cannot be easily moved relative to the strap once it is snapped into place. In a further embodiment, the channels of the strap can have non-parallel portions. In this respect, channels CE1 and CE2 can include a downwardly extending portion such as a downwardly extending channel end to engage the clip.

As can be appreciated, clips 10a and/or 10b could also be reversed such that they are oriented with flanges 92 and 102 locked into channels CE2 and CE1, respectively. Once locked in place, clip 10 can secured relative to the panel strap. By utilizing panel strap PS, one or even several clips can be quickly positioned and secured at a given location such as near an electrical panel (not shown).

In even yet another embodiment, the configuration of the clips according to the present invention can also be modified to matingly engage with mounting devices known in the industry or mounting devices which will be used in the industry.

The clip of this application can have many configurations or modification without detracting from the invention of this application. For example, flange 92 can have many different configurations including the four sided polygonal configuration described with respect to one of the embodiments above, a rectangular configuration, a semi-circular configuration or even combinations thereof. As discussed above, these configurations can be used for a mounting hole such as mounting hole 90 and/or can be used for the mating engagement with other object such as the use of flanges 92 and 102 to engage a panel strap. Further, this configuration can be based on manufacturing techniques to simplify the manufacturing process such as configurations that allow the clip to be extruded.

The material used for the clip can be any known material in the art including, but not limited to, a plastic clip material that is flexible with memory such as a non destructive polymer plastic with fire retardant qualities that is non toxic.

While considerable emphasis has been placed on the preferred embodiments of the invention illustrated and described herein, it will be appreciated that other embodiments and/or equivalents thereof can be made and that many changes can be made in the preferred embodiments without departing from the principals of the invention. Accordingly, it is to be distinctly understood that the foregoing descriptive matter is to be interpreted merely as illustrative of the invention and not as a limitation.

Having thus described the invention, it is so claimed:

1. A mounting arrangement for securing a flexible armored cable to a structural object, the flexible armored cable having a central cable axis and an outer armored layer extending about the cable axis, the outer layer being formed by alternating crowns and troughs, said mounting arrangement comprising a clip including a longitudinally extending clip body extending between a first and a second end thereby defining a clip length, said clip including a generally C-shaped wire receiving cavity extending about a cavity axis such that said cavity includes a cable receiving slot parallel to said cavity axis, said clip further including a first longitudinally extending flange at said first end and a second longitudinally extending flange at said second end, said first flange having a first transverse outer edge at least partially defining said first end and said second flange having a second transverse edge at least partially defining said second end, said first flange further including a first corner portion and a second corner portion, said second flange including a third corner portion and a fourth corner portion such that said first corner portion is cattycornered to said third corner portion defining a clearance length of said clip and said second corner portion is cattycornered to said fourth corner portion defining a locking length of said clip, said clearance length being less than said locking length; said mounting arrangement further including a panel strap securable to the structural object, said strap including a base plate and inwardly extending first and second side channels each shaped to receive a portion of a respective said flange, said each channel including inner edges facing one another thereby defining a clip receiving gap, said each channel further including side walls spaced from one another by an end wall spacing, said clearance length being less than said end wall spacing such that said clip can be received in said clip receiving gap and said locking length being greater than said end wall spacing wherein said clip can be rotated relative to said strap to substantially lock said clip relative to said strap.

2. The mounting arrangement of claim 1, wherein said clip further includes at least one transverse rib in said wire receiving cavity configured to at least partially enter a trough in an associated cable.

3. The mounting arrangement of claim 2, wherein said at least one transverse rib extends helically about the cable axis when in the engaged condition.

4. The mounting arrangement of claim 3, wherein said at least one transverse rib is at least three parallel ribs.

5. The mounting arrangement of claim 2, wherein said at least one transverse rib is at least three parallel ribs.

6. The mounting arrangement of claim 2, wherein said at least one transverse rib is at least five parallel ribs.

7. The mounting arrangement of claim 2, wherein said at least one transverse rib extends at least 100 degrees about said cavity axis.

8. The mounting arrangement of claim 2, wherein at least one of said first and second flanges includes a mounting hole.

9. The mounting arrangement of claim 8, wherein said mounting hole is in line with said cavity axis.

10. The mounting arrangement of claim 1, wherein said clip is a plurality of said clips.

11. The mounting arrangement of claim 1, wherein said clip is a first clip, said mounting arrangement further including a second clip also having a longitudinally extending body extending between a first and a second end thereby defining a second clip length, said second clip including a generally C-shaped receiving cavity extending about a cavity axis such that said cavity includes a slot parallel to said cavity axis shaped to receive a rigid pipe, said second clip further including a first longitudinally extending flange at said first end and a second longitudinally extending flange at said second end, said first flange having a first transverse outer edge at least partially defining said first end and said second flange having a second transverse edge at least partially defining said second end, said first flange further including a first corner portion and a second corner portion, said second flange including a third corner portion and a fourth corner portion such that said first corner portion is cattycornered to said third corner portion defining a clearance length of said second clip and said second corner portion is cattycornered to said fourth corner portion defining a locking length of said second clip, said clearance length of said second being less than said locking length of said second clip, said clearance length of said second clip being less than said end wall spacing of said panel strap such that said second clip can be received in said clip receiving gap of said strap and said locking length of said second clip being greater than said end wall spacing wherein said second clip can be rotated relative to said strap to substantially lock said second clip relative to said strap.

12. The mounting arrangement of claim 11, wherein said first clip includes at least one transverse rib in said wire receiving cavity configured to at least partially enter a trough in an associated cable.

13. The mounting arrangement of claim 11, wherein said first clip is a plurality of first clips and said second clip is a plurality of second clips.

14. A clip for use in a mounting arrangement for securing a conduit to a structural object having a central conduit axis, the mounting arrangement including an associated panel strap securable to the structural object having a base plate and inwardly extending first and second side channels each having an inner edge facing one another thereby defining a clip receiving gap, said each channel further including side walls spaced from one another by an end wall spacing, said clip comprising a longitudinally extending clip body extending between a first and a second end thereby defining a clip length, said clip including a generally C-shaped wire receiving cavity extending about a cavity axis such that said cavity includes a cable receiving slot parallel to said cavity axis, said clip further including a first longitudinally extending flange at said first end and a second longitudinally extending flange at said second end, said first flange having a first transverse outer edge at least partially defining said first end and said second flange having a second transverse edge at least partially defining said second end, said first flange further including a first corner portion and a second corner portion, said second flange including a third corner portion and a fourth corner portion such that said first corner portion is cattycornered to said third corner portion defining a clearance length of said clip and said second corner portion is cattycornered to said fourth corner portion defining a locking length of said clip, said clearance length being less than said locking length, said clearance length being less than said end wall spacing such that said clip can be received in the clip receiving gap of the panel strap and said locking length being greater than said end wall spacing of the strap wherein said clip can be rotated relative to the strap to substantially lock said clip relative to the strap.

15. The clip of claim 14, wherein said clip further includes at least one transverse rib in said wire receiving cavity configured to at least partially enter a trough in an associated cable.

16. The clip of claim 15, wherein said at least one transverse rib extends helically about the cable axis when in the engaged condition.

17. The clip of claim 16, wherein said at least one transverse rib is at least three parallel ribs.

18. The clip of claim 15, wherein said at least one transverse rib is at least three parallel ribs.

19. The clip of claim 15, wherein said at least one transverse rib is at least five parallel ribs.

20. The clip of claim 15, wherein said at least one transverse rib extends at least 100 degrees about said cavity axis.

21. The clip of claim 14, wherein at least one of said first and second flanges includes a mounting hole.

22. The clip of claim 14, wherein said mounting hole is in line with said cavity axis.

* * * * *